(12) United States Patent
Steine et al.

(10) Patent No.: US 11,761,272 B2
(45) Date of Patent: Sep. 19, 2023

(54) METHOD FOR ATTACHING A CONTROL LINE CLAMP

(71) Applicant: Ace Oil Tools AS, Randaberg (NO)

(72) Inventors: Ken Erik Steine, Randaberg (NO);
Lasse Hetland, Randaberg (NO);
Morten Klausen, Randaberg (NO);
Espen Sørbø, Randaberg (NO);
Anbjørn Kaurstad, Randaberg (NO)

(73) Assignee: Ace Oil Tools AS, Randaberg (NO)

( * ) Notice: Subject to any disclaimer, the term of this patent is extended or adjusted under 35 U.S.C. 154(b) by 0 days.

(21) Appl. No.: 18/062,175

(22) Filed: Dec. 6, 2022

(65) Prior Publication Data

US 2023/0099581 A1 Mar. 30, 2023

Related U.S. Application Data

(63) Continuation of application No. PCT/EP2021/065299, filed on Jun. 8, 2021.

(51) Int. Cl.
*E21B 17/10* (2006.01)
*E21B 17/02* (2006.01)
*E21B 19/24* (2006.01)

(52) U.S. Cl.
CPC ........ *E21B 17/1035* (2013.01); *E21B 17/026* (2013.01); *E21B 19/24* (2013.01)

(58) Field of Classification Search
CPC ............................ E21B 17/1035; E21B 17/026
See application file for complete search history.

(56) References Cited

U.S. PATENT DOCUMENTS

| | | | |
|---|---|---|---|
| 2,040,405 | A | 6/1962 | Solum |
| 2008/0023192 | A1 | 1/2008 | Hayes et al. |
| 2013/0186640 | A1 | 7/2013 | Webre et al. |
| 2016/0047174 | A1 | 2/2016 | O'Brien |

FOREIGN PATENT DOCUMENTS

| | | |
|---|---|---|
| CN | 106968613 A | 7/2017 |
| WO | 2014011056 A1 | 1/2014 |
| WO | 2014180816 A2 | 11/2014 |
| WO | 2017009440 A1 | 1/2017 |

OTHER PUBLICATIONS

Combined Search and Examination Report for GB Patent Application No. 2008604.7, dated Oct. 13, 2020.
International Search Report and Written Opinion for PCT/EP2021/065299, dated Aug. 6, 2021.

*Primary Examiner* — Kristyn A Hall
(74) *Attorney, Agent, or Firm* — Andrus Intellectual Property Law, LLP

(57) ABSTRACT

A control line clamp includes a clamping element for retaining one or more control lines alongside a pipe; a first collar; and a second collar. The clamping element is arranged to be attached to the pipe by positioning the first and second collars around the pipe on opposing sides of the clamping element and moving the first and second collars relatively towards each other in an axial direction.

20 Claims, 13 Drawing Sheets

METHOD FOR ATTACHING A CONTROL LINE CLAMP

CROSS-REFERENCE TO RELATED APPLICATIONS

The present application claims priority to GB Patent Application No. 2008604.7, filed Jun. 8, 2020, which is incorporated herein by reference, in entirety.

BACKGROUND OF THE INVENTION

Control lines are used to control, provide power to, and communicate with downhole equipment during hydrocarbon extraction. Control lines may be electrical cables, fibre optic lines or hydraulic lines for example, and they can be connected to a variety of downhole equipment such as hydraulic pumps, valves and sensors.

Control lines are commonly arranged around the outside of a production tubing and are run into a wellbore in parallel with the tubing. Several control lines may run alongside each other and perform different tasks, and multiple control lines can be spliced within a single housing or flatpack and separated out as needed.

It is known to use control line clamps to attach control lines to the outer surface of a downhole pipe, such as a production tubing. This is generally performed manually by workers on the rig floor when the production tubing is lowered into the wellbore. This area of the rig floor is known as the red zone and is a dangerous place for workers due to the close proximity to heaving drilling equipment.

In addition, existing control line clamps are heavy for workers to manoeuvre and often require relatively intricate tasks to be performed during installation, such as tightening screws. Installation of these clamps is therefore labour intensive, making it both expensive and time consuming.

SUMMARY OF THE INVENTION

According to a first aspect of the invention, there is provided a control line clamp assembly comprising a clamping element for retaining one or more control lines alongside a pipe; a first collar; and a second collar, wherein the clamping element is arranged to be attached to the pipe by positioning the first and second collars around the pipe on opposing sides of the clamping element and moving the first and second collars relatively towards each other in an axial direction.

The axial direction is the direction parallel to the axis of the pipe.

Advantageously, the components of the control line clamp assembly are shaped to be held and manipulated by automation, for example a robot, so that the assembly can be installed by in an automated manner, i.e. without human intervention. In an example implementation, the automation grips the clamping element and positions it against the outer surface of the first collar at any circumferential angle and then presses the first collar and second collar together to attach the control line clamp to the pipe.

Unlike conventionally mounted control line clamps, which are often screwed or welded onto a tubing, the control line clamp of the present invention can be attached to a pipe simply by positioning the first and second collars around the pipe on either side of the clamping element and pressing them together, thereby facilitating installation of the control line clamp assembly by a robot. No pins, screws or welding are required to attach the control line clamp assembly to the tubing.

As the control line clamp assembly is adapted to be installed by in an automated manner, fewer workers are needed in the red zone on the drill floor. Removing personnel from the red zone during operations on the drill floor greatly reduces the overall risk for accidents, and in worst case, deaths. By adding automation in the form of robotic installation, the need for personnel can be vastly reduced.

In addition, automated installation is both quicker and cheaper than manual installation and has the potential to be more reliable and repeatable.

Preferably, the first collar comprises an engagement region arranged to engage with a first engagement region on the clamping element. Additionally or alternatively, the second collar may also comprise an engagement region arranged to engage with a second engagement region on the clamping element.

In use, at least part of the engagement region on each collar surrounds at least part of the corresponding engagement region on the clamping element. This engagement between the engagement region of the collar and the engagement region of the clamping element restricts axial and radial movement of the clamping element relative to the collars through abutment between the respective engagement regions. In other words, when the control line clamp is installed, the engagement regions couple the clamping element to each collar so that the clamping element does not separate from the collars.

In some embodiments, the engagement region on the first and/or second collar may comprise one or more recesses or slots, and the first and/or second engagement region on the clamping element may comprise one or more axial lips or protrusions.

Alternatively, the engagement region on the first and/or second collar may comprise one or more axial lips on protrusions and the first and/or second engagement region on the clamping element may comprise one or more recesses or slots.

The axial lips or protrusions are arranged to be received in the recesses or slots such that that the recesses or slots at least partly surround the axial lips or protrusions when the first and second collars are pressed together. In use, the inner surfaces of the recesses or slots provide a surface against which the lips or protrusions abut so as to restrict or prevent relative axial and radial movement between the clamping element and collars.

Preferably, the first and/or second collars are adapted to be fixed to the pipe and/or other collar, thereby preventing the collars moving axially along the pipe or rotating about the pipe.

As the clamping element is fixed relative to the collars, fixing one or both of the collars to the pipe in turn prevents the clamping element moving axially along the pipe.

In some embodiments, the first collar is a male collar and the second collar is a female sleeve, wherein the female sleeve is arranged to receive at least part of the male collar. Alternatively, the first collar may be a female sleeve and the second collar may be a male collar, wherein the female sleeve is arranged to receive at least part of the male collar.

In embodiments where one collar is a male collar and the other collar is a female collar, the male collar preferably comprises a plurality of fingers and the female sleeve is preferably arranged to receive the plurality of fingers, wherein when the male collar and female sleeve are pressed together each of the plurality of fingers is deflected inwards to grip the pipe. This allows the control line clamp assembly to be attached to the pipe simply by pressing the male collar and female sleeve together, thereby causing the plurality of fingers to defect towards the pipe. The deflection of the fingers against the pipe holds the male collar against the outer surface of the pipe.

Preferably, when pressed together, the male collar and female sleeve are held together by a ratchet. This ratchet mechanism prevents the male collar and female sleeve moving axially away from each other, i.e. the female collar is fixed to the male collar by more than friction alone. As the fingers of the male collar attach the male collar to the pipe, the attachment between the male and female collars in turn fixes the female collar to the pipe. Because the clamping element is retained by the male and female collars being pressed together, the ratchet also ensures that the clamping element remains fixed in position relative to the pipe.

In some embodiments, an inner surface of the clamping element may be arranged to abut a circumferential outer surface of the first collar.

The circumferential outer surface of the first collar may comprise one or more protrusions arranged to engage or interlock with a corresponding one or more recesses on the inner surface of the clamping element.

Alternatively, the circumferential outer surface of the first collar may comprise one or more recesses arranged to engage with a corresponding one or more protrusions on the inner surface of the clamping element.

These protrusions and recesses help to prevent rotational movement of the clamping element relative to the first and/or second collars by providing one or more surfaces that oppose relative rotational movement between the collars and the clamping element, that is, one or more abutting surfaces that are perpendicular to the circumference of the pipe.

In addition, the one or more protrusions may be tapered in an axial direction such that the one or more protrusions on the first collar are thinner towards the end of the first collar that faces towards the second collar when installed, and thicker towards the end of the first collar that faces away from the second collar in use.

Additionally, the corresponding one or more recesses may be tapered in a corresponding axial direction such that the tapered recesses cooperate with the tapered protrusions. This tapering of the protrusions and recesses helps to ensure that the protrusions and recesses align correctly during installation of the control line clamp assembly. The tapering guides or channels the protrusions into the recesses as the protrusions and recesses engage with each other.

In some embodiments, the circumferential outer surface of the first collar may comprise one or more circumferential teeth arranged to engage with an outer surface of a control line or control line housing. The circumferential teeth embed in the outer surface of a control line, control line housing or flatpack, thereby reducing the risk of the control lines moving axially relative to the control line clamp assembly.

According to a second aspect of the invention, there is provided a control line clamp assembly comprising clamping element for retaining one or more control lines alongside a pipe; and a collar, wherein the clamping element is adapted to engage with the collar and wherein the clamping element and collar are together adapted to attach to the pipe.

The components of the control line clamp assembly are shaped to be held and manipulated by a robot so that the assembly can be installed in an automated manner. In an example implementation, the automation grips the clamping element and positions it against the outer surface of the first collar at any circumferential angle and then presses the clamping element and collar together to attach the control line clamp to the pipe.

Unlike conventionally mounted control line clamps, which are often screwed or welded onto a tubing, the control line clamp of the present invention can be attached to a pipe simply by positioning the first and second collars around the pipe on either side of the clamping element and pressing them together, thereby facilitating installation of the control line clamp assembly by automation. No pins, screws or welding are required to attach the control line clamp assembly to the tubing.

As the control line clamp assembly is adapted to be installed by automation, fewer workers are needed in the red zone on the drill floor. Removing personnel from the red zone during operations on drill floor greatly reduces the overall risk for accidents, and in worst case, deaths. By adding automation in the form of automated installation, the need for personnel can be vastly reduced.

In addition, automated installation is both quicker and cheaper than manual installation and has the potential to be more reliable and repeatable.

In some embodiments according to the second aspect, the clamping element is arranged to be attached to the pipe by positioning the collar around the pipe and positioning the clamping element against an outer surface of the pipe and moving the collar and clamping element relatively towards each other in an axial direction.

Preferably, the collar comprises an engagement region arranged to engage with an engagement region on the clamping element.

In use, at least part of the engagement region on the collar surrounds at least part of the engagement region on the clamping element. This engagement between the engagement region of the collar and the engagement region of the clamping element restricts axial and radial movement of the clamping element relative to the collars through abutment between the respective engagement regions. In other words, when the control line clamp is installed, the engagement regions couple the collar and clamping element so that they do not separate.

In some embodiments, the engagement region on the collar may comprise one or more recesses or slots and the engagement region on the clamping element may comprise one or more axial lips or protrusions.

Alternatively, the engagement region on the clamping may comprise one or more axial lips on protrusions and the engagement region on the clamping element may comprise one or more recesses or slots.

The axial lips or protrusions are arranged to be received in the recesses or slots such that that the recesses or slots at least partly surround the axial lips or protrusions when the collar and clamping element are pressed together. In use, the inner surfaces of the recesses or slots provide a surface against which the lips or protrusions abut so as to restrict or prevent relative axial and radial movement between the clamping element and collar.

In some embodiments of the second aspect, the collar is a female sleeve, wherein the female sleeve is arranged to receive at least part of the clamping element.

In embodiments where the collar is a female sleeve, the clamping element preferably comprises a plurality of fingers and the female sleeve is arranged to receive the plurality of fingers, wherein when the clamping element and female sleeve are pressed together each of the plurality of fingers is deflected inwards to grip the pipe. This allows the control line clamp assembly to be attached to the pipe simply by pressing the male collar and female sleeve together, thereby causing the plurality of fingers to defect towards the pipe. The deflection of the fingers against the pipe holds the clamping element against the outer surface of the pipe.

Preferably, when pressed together, the clamping element and female sleeve are held together by a ratchet. This ratchet mechanism prevents the clamping element and female sleeve moving axially away from each other, i.e. the female collar is fixed to the clamping element by more than friction alone.

In embodiments of the both the first and second aspect, the inner surface of the clamping element may comprise one or more slots arranged to receive one or more control lines or control line housings. These slots allow control lines to be retained alongside the pipe by the control line clamp assembly.

Preferably, the clamping element has an arc-shaped cross section. This allows the clamping element to be positioned over the pipe as the pipe is run into the wellbore. The collars can be placed around the pipe prior to completion, and the clamping element can be positioned during completion. The arcuate shape of the clamping element means that the control lines do not have to be threaded through the clamping element when being deployed, thereby simplifying installation.

Optionally, the arc-shaped cross section may be larger than a semicircle. This increases the holding force of the clamping element around the pipe and increase the contact surface area between the clamping element and the first and/or collar.

Alternatively, the arc-shaped cross section may be smaller than a semicircle. This means the clamping element does not need to be elastically deformed as it is positioned over the pipe.

The arc-shaped cross section may alternatively be a semicircle.

According to a third aspect of the invention, there is provided a method for attaching a control line clamp according to any preceding claim to a pipe, comprising: positioning the first collar around the pipe; positioning the second collar around the pipe; positioning one or more control lines alongside the pipe; positioning the clamping element over the control lines with at least part of the clamping element between at least part of the first collar and at least part of the second collar; and moving the first and second collars relatively towards each other in an axial direction to thereby attach the clamping element to the pipe.

This method can be performed by in an automated manner. The automation manipulates the collars and clamping elements into the correct positions and presses the collars together. No pins, screws or welding are required to attach the control line clamp assembly to the tubing.

As the control line clamp assembly is adapted to be installed in an automated matter, fewer workers are needed in the red zone on the drill floor. Removing personnel from the red zone during operations on drill floor greatly reduces the overall risk for accidents, and in worst case, deaths. By adding automation in the form of automation installation, the need for personnel can be vastly reduced.

Preferably the method further comprises pressing the first and second collars loosely together prior to positioning the clamping element over the control lines between the first and second collars, wherein moving the first and second collars relatively towards each other in the axial direction comprises further pressing the first and second collars together.

This allows the collars to be loosely attached to the pipe in a pre-configured position, thereby removing the need to hold them in place around the pipe when installing the clamping element.

Even more preferably, the method further comprises lightly pressing the first collar and second collar together prior to positioning the one or more control lines alongside the pipe.

This allows the collars to be loosely attached to the pipe in a pre-configured position, thereby removing the need to hold them in place around the pipe when installing the clamping element. This can optionally be performed on-shore prior to completion.

DETAILED DISCLOSURE

The present invention provides an improved control line clamp for attachment to the outer surface of a pipe for securing control lines alongside a tubing or other pipe. Although the control line clamp is described in relation to a device for securing or clamping control lines to the outside of a production tubing, it could also be used for clamping control lines or similar to a casing string or any other tubular used in hydrocarbon extraction.

The words tubular, casing, pipe, production tubing and tubing may be used interchangeably through the present description to refer to a production tubing or similar which is run into a wellbore within a casing or casing string or similar.

Figure 1:
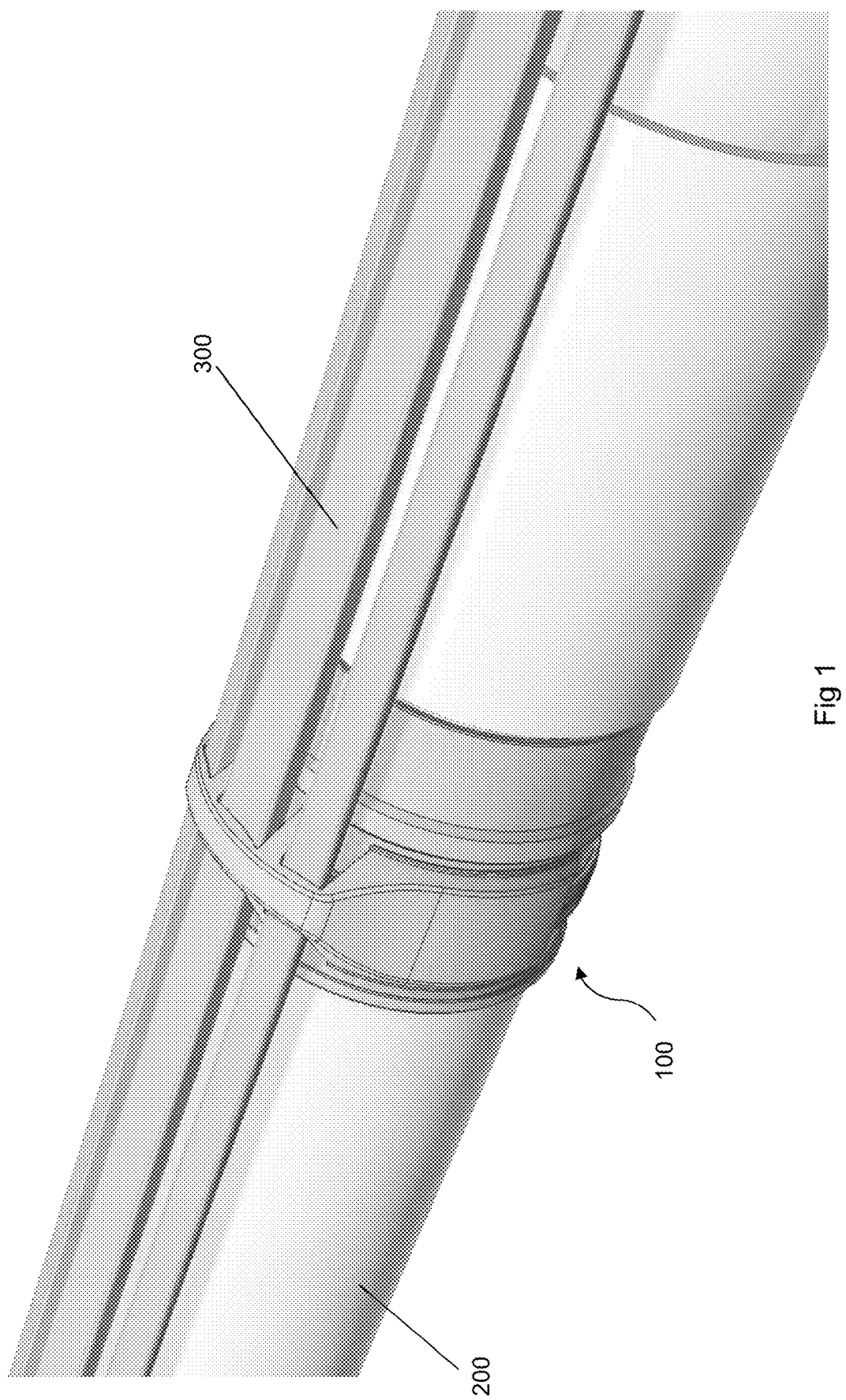
FIG. 1 shows a control line clamp assembly attached to a tubing.
Figure 11:
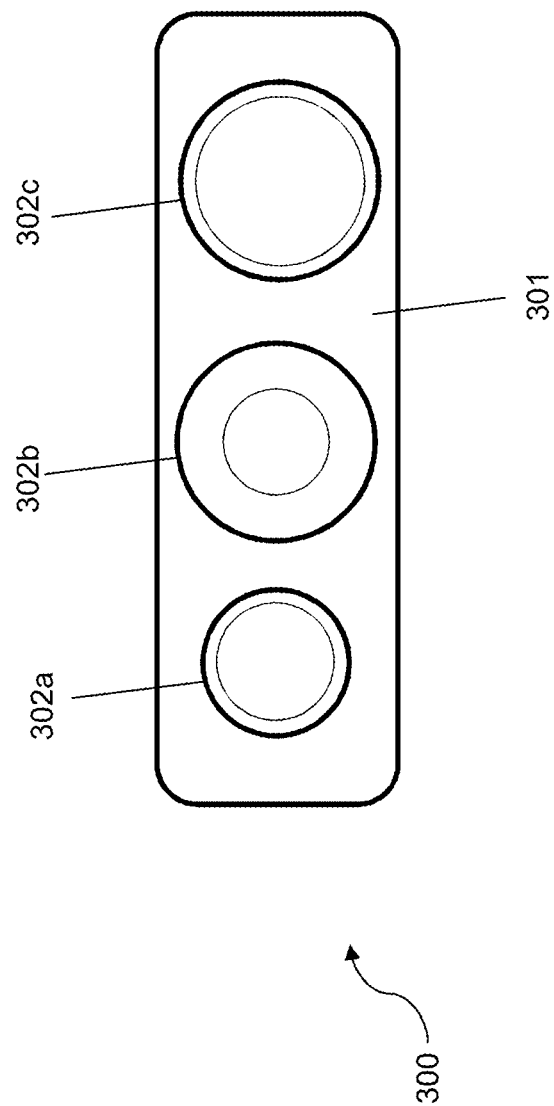
FIG. 11 shows a cross section of a flatpack.

FIG. 1 shows a control line clamp assembly 100 attached to a tubing 200. The control line clamp assembly 100 is shown retaining several control lines 300 alongside the tubing 200. These control lines 300 may be single control lines, or they may be multiple control lines contained together within a housing or flatpack, such as the flatpack shown in FIG. 11 which has a casing 301 surrounding three cables 302a, 302b and 302c.

As shown in FIGS. 2, 3, 4 and 5, the control line clamp assembly 100 has three separate parts, namely a male collar 110, a female collar 120, and a clamping element 130. In use, the clamping element 130 is positioned over the control lines 300 and is held in place between the male collar 110 and female collar 120, which together form an attachment mechanism for fixing the control line clamp assembly 100 to the outer surface of the tubing 200.

Figure 2:
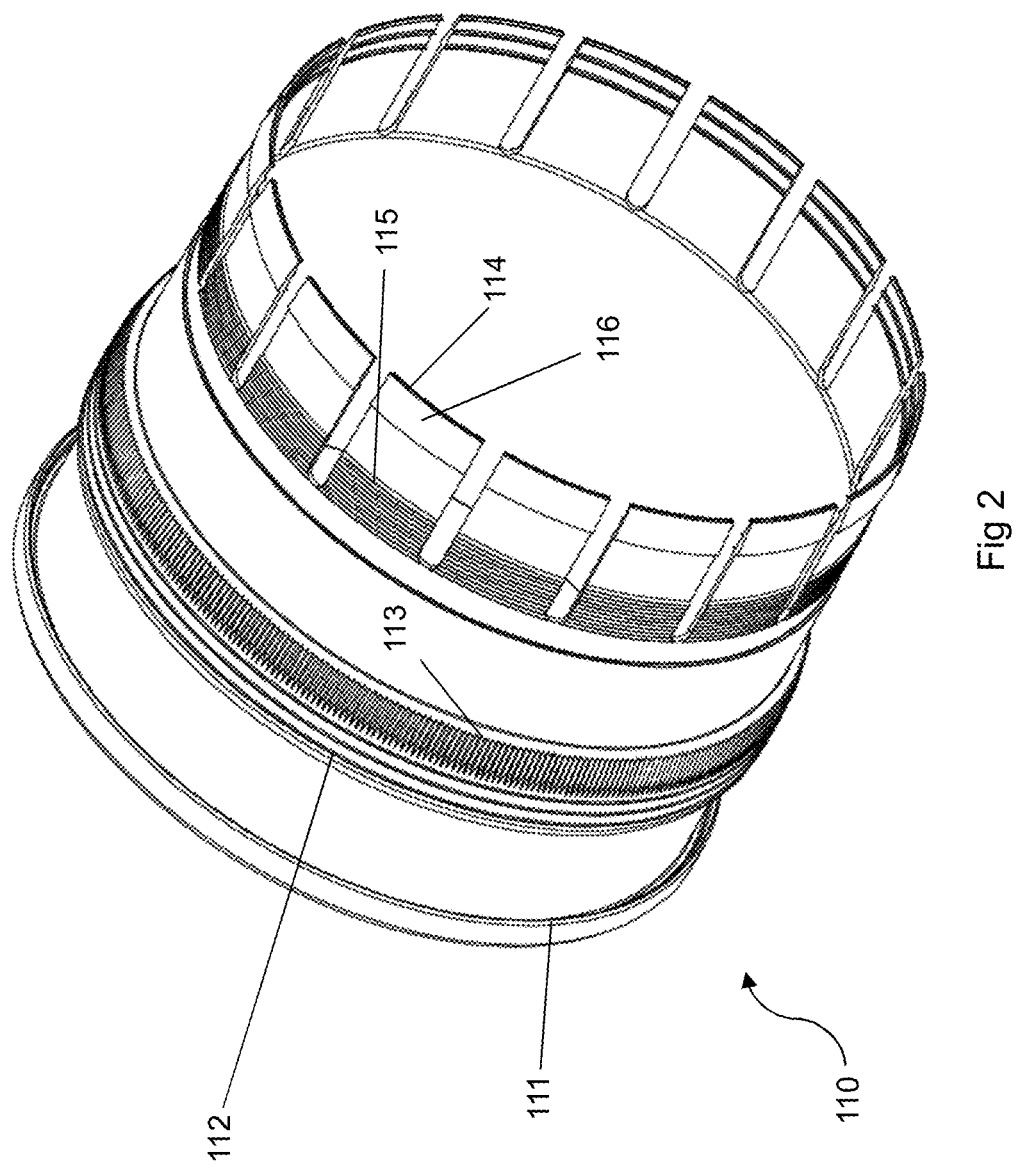
FIG. 2 shows a male collar of the control line clamp assembly.
Figure 6A:
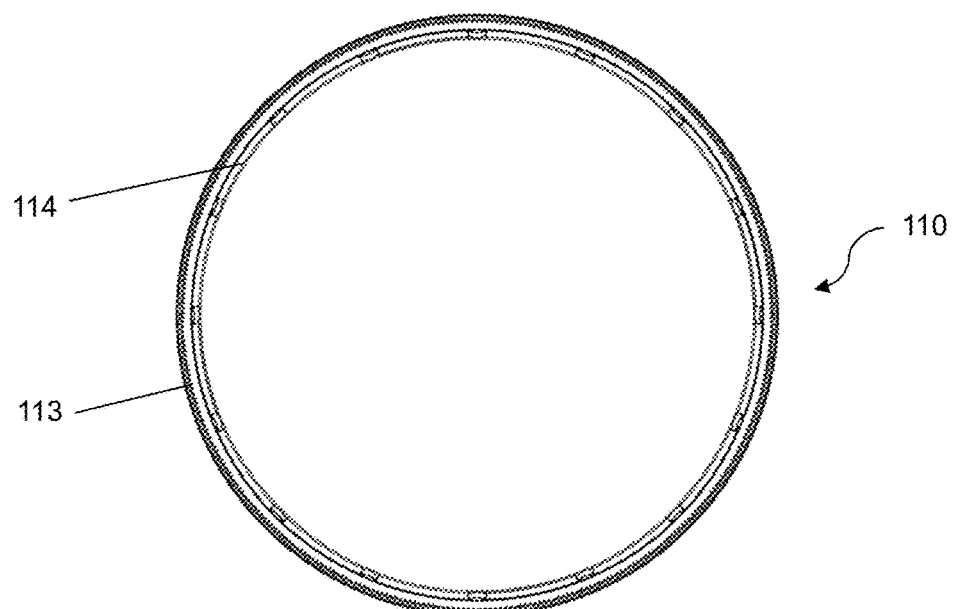
FIGS. 6a, 6b and 6c show end-on, side-on and cross-sectional views of the male collar respectively.
Figure 6B:
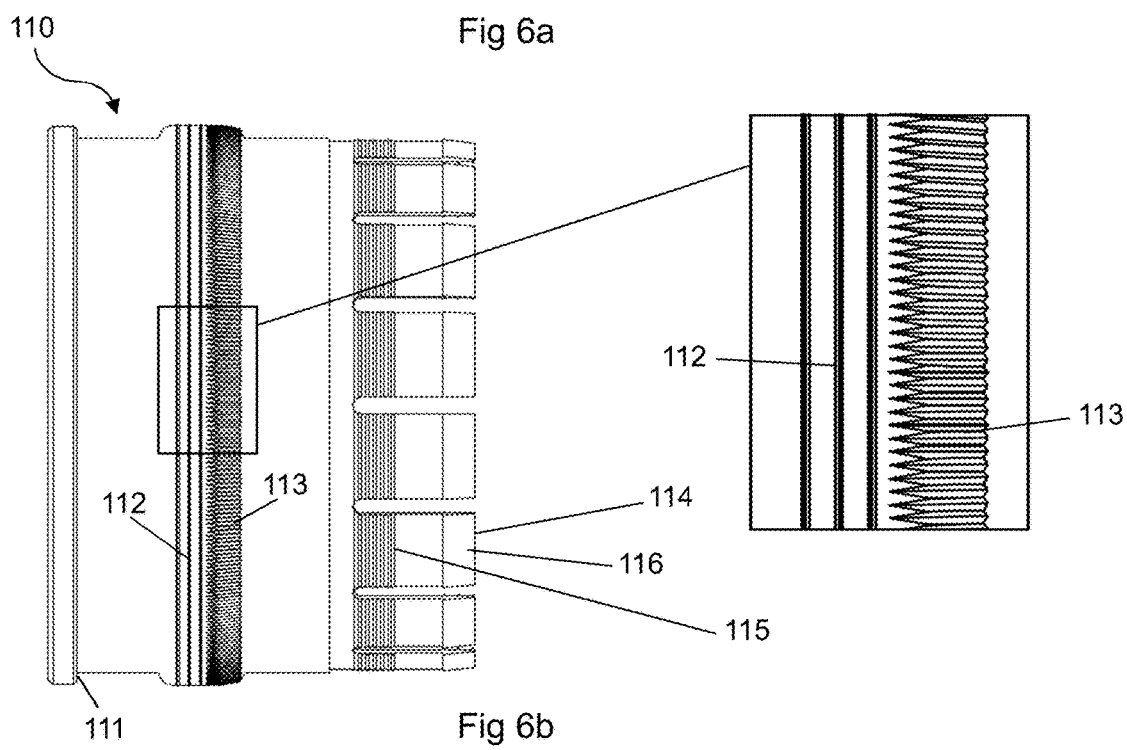
Figure 6C:
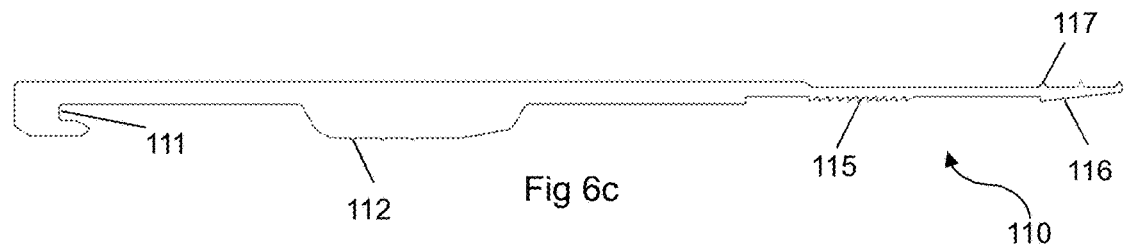

Referring now to FIG. 2, the male collar 110 is generally tubular in shape and has a plurality of gripping fingers 114 protruding axially at one end, and a groove or recess 111 for retaining part of the clamping element 130 at the opposing end. Additional views of the male collar 110 are shown in FIGS. 6a, 6b and 6c.

The gripping fingers 114 of the male collar 110 are created by providing a plurality of equal length, linear and axially aligned slots. A gripping finger 114 is formed between any two adjacent slots. Each of the gripping fingers 114 extends axially away from a tubular body of the male collar 110.

The gripping fingers 114 may also be referred to as arms, deformable members or other interchangeable terminology to describe a plurality of elements which extend from a base toward a tip and bend or deflect radially inward from a base to grip the pipe, the elements being separated by slots extending from the tip to the base.

To fix or mount the control line clamp assembly 100 to the tubing 200, the plurality of gripping fingers 114 is arranged to deflect or bend radially inward by abutment against the inner surface of the female collar 120, as will be described in more detail below.

Figure 3:
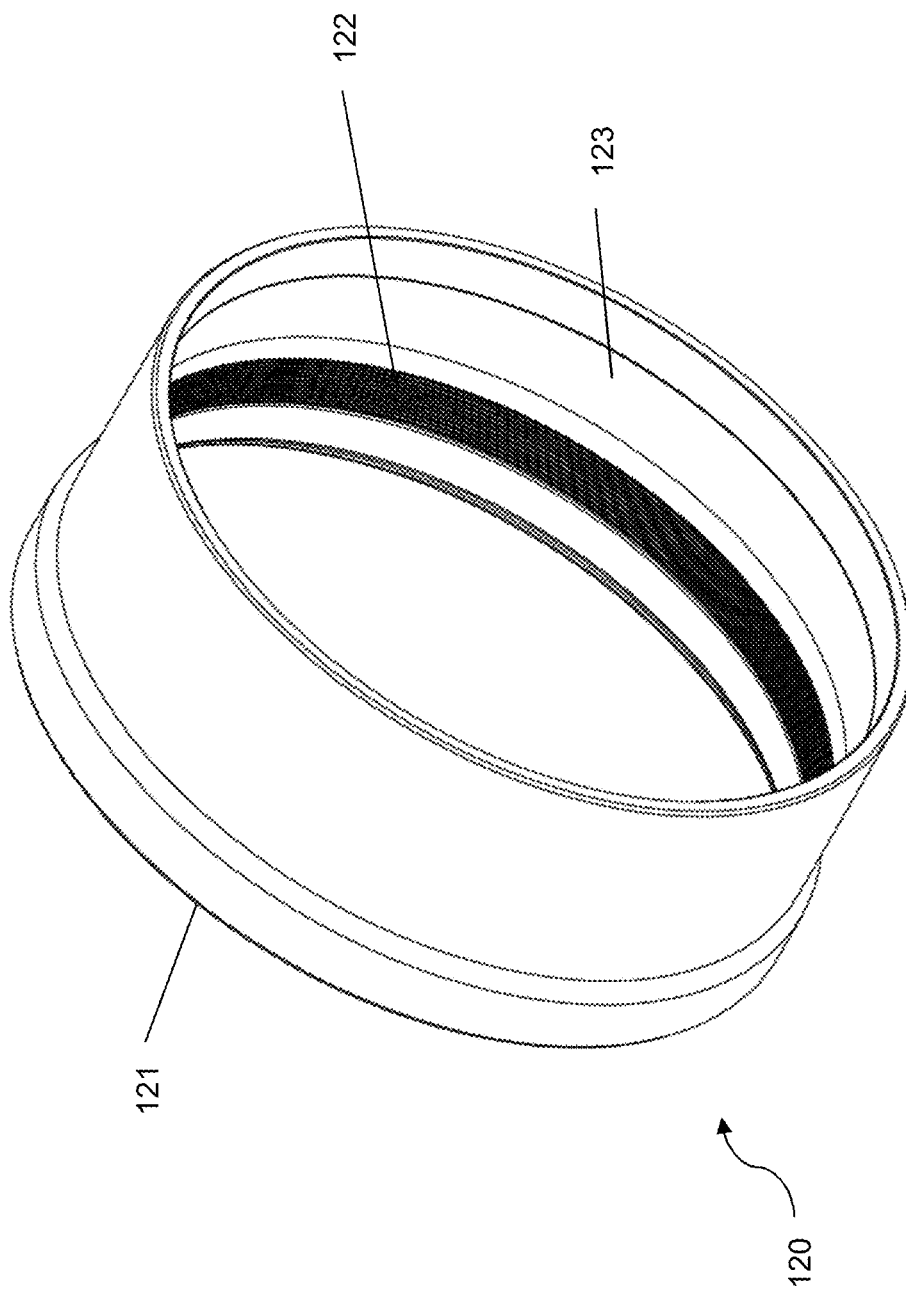
FIG. 3 shows a female collar of the control line clamp assembly.
Figure 7A:
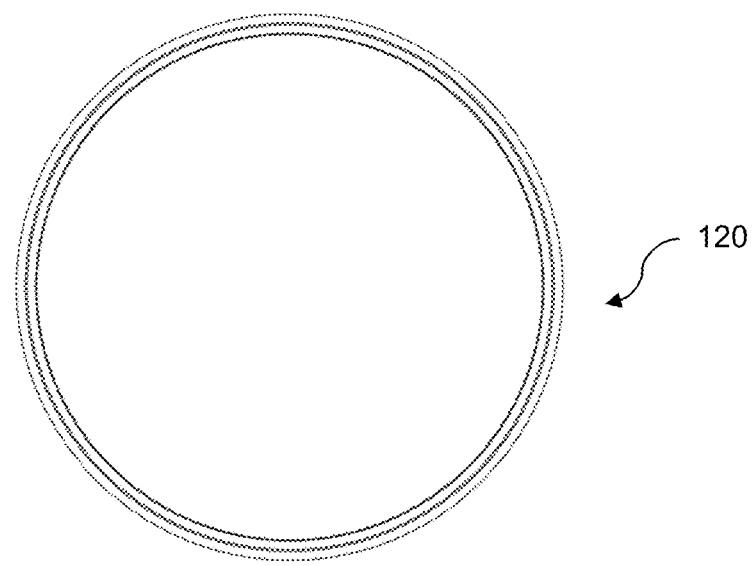
FIGS. 7a, 7b and 7c show end-on, side-on and cross-sectional views of the female collar respectively.
Figure 7B:
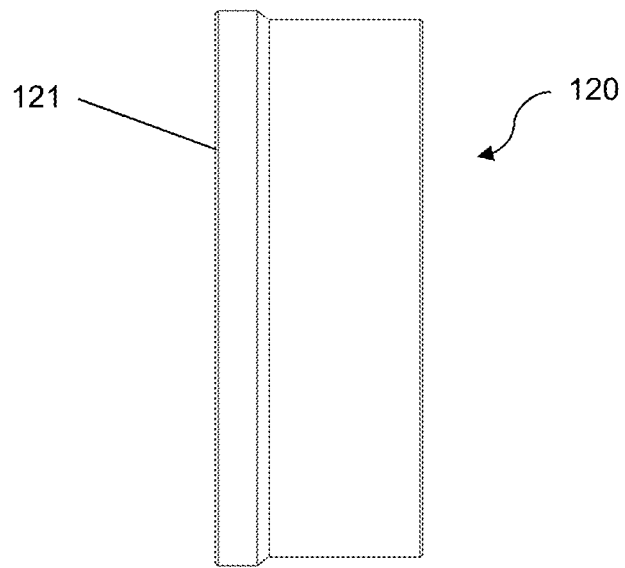

Referring now to FIG. 3, the female collar 120 is also generally tubular in shape and has a recess 121 for retaining part of the clamping element 130 at one end. Additional views of the female collar 120 are shown in FIGS. 7a, 7b and 7c.

Figure 7C:
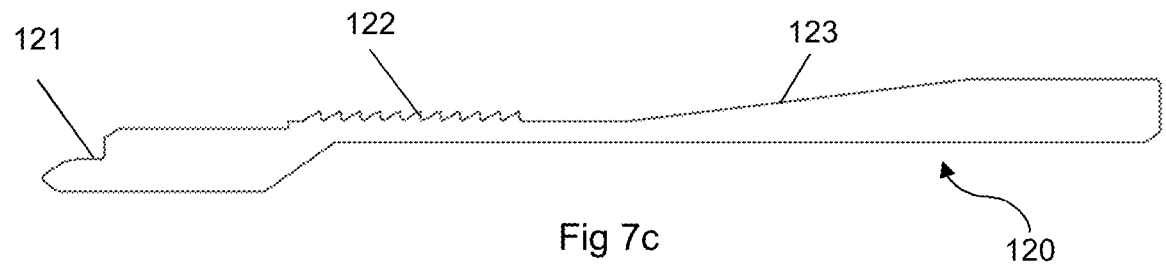

As best seen in FIG. 7c, the inner surface of the female collar 120 has a tapered portion 123 that gives the inner surface a conical shape, i.e. a section of the wall of the female collar 120 is tapered along its longitudinal axis and is therefore shaped like part of the surface of the cone. This tapering means that one end of the female collar 120 is narrower than the other.

In use, the outer surfaces of the gripping fingers 114 of the male collar 110 abut against this tapered portion 123. As best seen in FIG. 6c, the gripping fingers 114 also have tapered portions 116, with a narrower outer diameter at the tip of each finger, that is, at the distal end of each finger. In this way, the tapered gripping fingers 114 may more effectively abut the tapered portion 123 of the female sleeve 120. The tapering angle of the tapered portions 116 and 123 is preferably substantially the same.

To attach the control line clamp assembly 100 to a tubing 200, the male collar 110 and the female collar 120 are positioned axially on the tubing 200 and the male collar 110 is press fitted into the female collar 120. The male collar 110 and the female collar 120 are positioned on or around the tubing 200 such that the end of the female collar 120 with the larger inner diameter is forced over the gripping fingers 114 of the male collar 110. As the female collar 120 is pressed over the gripping fingers 114, the tapered portion 123 of female collar 120 causes the gripping fingers 114 to deflect radially inwards to grip the tubing 200.

The magnitude of deflection increases as the female collar 120 is pressed further over the gripping fingers 114, which reduces the inner circumference defined by the gripping fingers 114. In this way, the gripping fingers 114 provide an inward force against the tubing 200 to fix the control line clamp assembly 110 to the tubing 200.

Referring now to FIGS. 6c and 7c, one or more ridged grooves/raised ridges/pawls/circumferential annular catches 115 may be provided on the outer surface of the gripping fingers 114. A plurality of ridged grooves/raised ridges/pawls/circumferential annular catches 122 is also provided on an inner surface of the female collar 120. The ridges 115 on the gripping fingers 114 and the ridges 122 on the female collar 120 together form a ratchet so that after the female collar 120 has been pressed onto a position where the control line clamp assembly 100 is sufficiently gripped to a pipe, the ratchet holds the male collar 110 and female collar 120 in position relative to each other.

Although the illustrated male collar 110 has the ridges 115 on the gripping fingers 114, alternatives are envisaged in which the ridges 115 are instead on the body of the male collar 110, i.e. not on the gripping fingers 114.

The ridges 115 and 122 are each provided with a conical first face, for example with a pitch in the range of 20-35°, and an opposite second face that forms an abutment surface perpendicular to a central axis of the male collar 110 or female collar 120. The ridges 115 and 122 are complementary to each other such that as the female collar 120 is pressed axially onto the gripping fingers 114, each ridge 122 on the female collar 120 slides with a conical inward face against the conical outward faces of the circumferential ridges 115 of the gripping fingers 114. The gripping fingers 114 are displaced radially inwards until the ridges 122 of female collar 120 engage behind the ridges 115 of the gripping fingers 114. Once engaged, abutment between the respective perpendicular second faces of the ridges 115 and 122 resists the male collar 110 and female collar 120 being separated by an axial force, effectively locking the gripping arms 114, and therefore the male collar 110, within the female collar 120. The ridges 114 and 122 are typically similarly shaped and arranged with regular axial spacing and corresponding pitch angles. A similar attachment mechanism is disclosed in WO 2014/011056 A1, which is hereby incorporated by reference.

As seen in FIG. 7c, the inner surface of the gripping fingers 114 may comprise a plurality of gripping teeth 117 which grip the tubing 200 when the gripping fingers 114 are deflected radially inwards as the male collar 110 and female collar 120 are pressed together.

The illustrated gripping teeth 117 are formed of a plurality of circumferential protrusions on the inner part of the gripping fingers 114 at the proximal end or tip of the fingers. Gripping teeth 117 arranged in this way may prevent axial 10 movement of the control line clamp assembly 100 relative to the tubing 200 by creating an edge which transmits force to the tubing 200.

The gripping teeth 117 may further comprise a series of longitudinal slits (not shown) in the gripping teeth 117 of each gripping finger 114. Such longitudinal slits help to prevent radial movement of the control line clamp assembly 100 by creating additional edges that can exert a radial force on the tubing 200.

Referring again to FIG. 2, the outer surface of the male collar 110 has several circumferential teeth 112, which in the illustrated embodiment are formed by ridges spanning the entire circumference of the external surface of the male collar 112 without interruption. Although this is a preferred embodiment, alternative embodiments are envisaged in which the circumferential teeth 112 are formed by a series of circumferential ridges (for example, with interruptions or slits between sections of teeth) and/or in which the circumferential teeth 112 only span part of the circumference of the male collar 110. Alternatively, the circumferential teeth 112 could be replaced by a rough/textured surface that creates a high friction gripping face for abutting against the control lines 300, for example by providing a rough dotted surface.

The primary purpose of the circumferential teeth 112 is to slightly embed in the outer surface of the control lines 300 or control line housings/casings in order to prevent axial movement of the control lines 300 relative to the control line clamp assembly 100 and tubing 200.

For embodiments in which the circumferential teeth 112 are formed by a series of interrupted ridges, the teeth additionally help to restrict circumferential movement of the control lines 300 relative to the control line clamp assembly 100 and tubing 200 by providing an edge for exerting an opposing force on the outer surface of the control lines 300.

Figure 4:
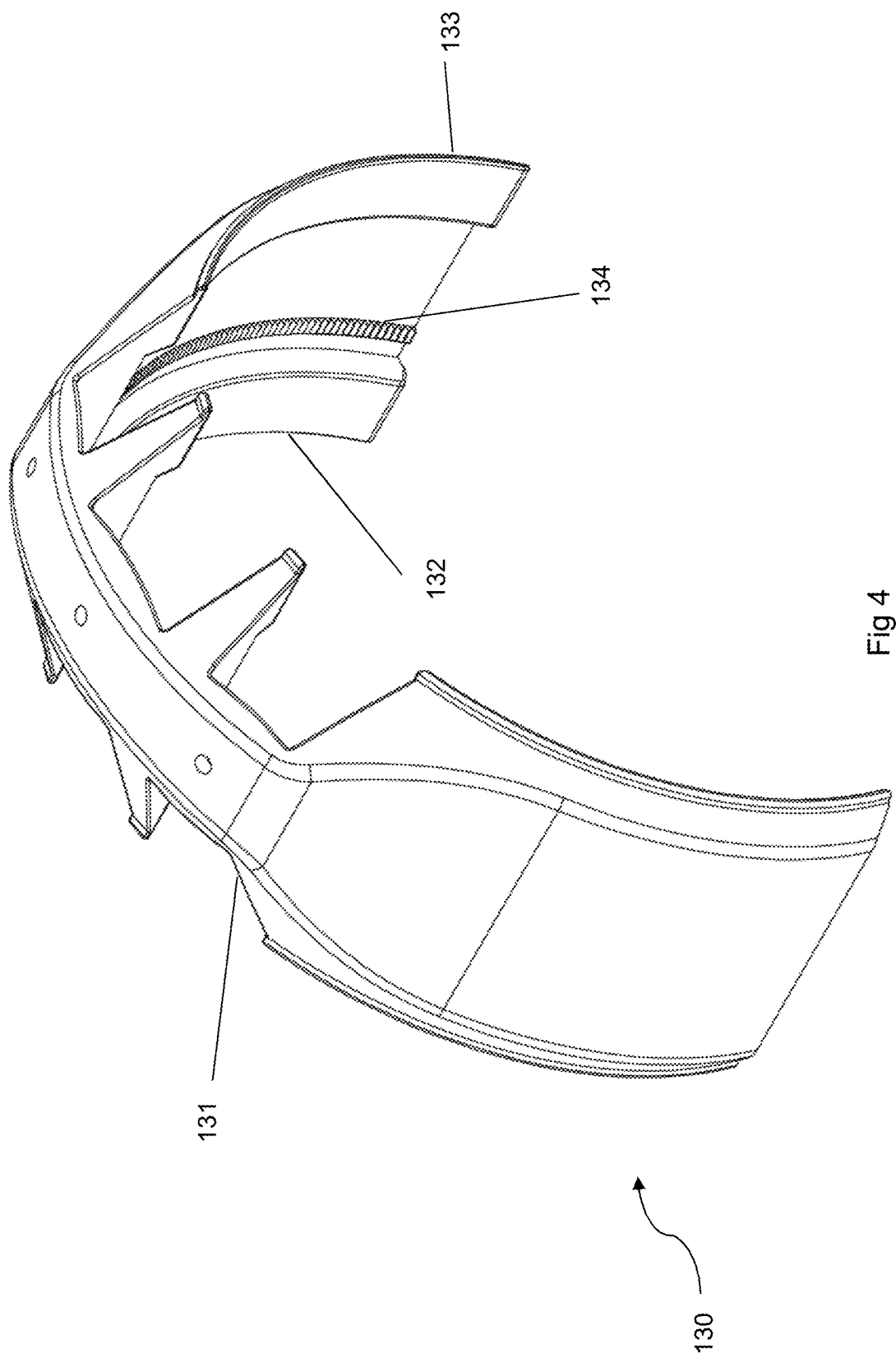
FIG. 4 shows a clamping element of the control line clamp assembly.

In addition to the circumferential teeth 112, the male collar 110 also has a series of axial protrusions 113 around its outer circumference, which are shaped to interface with a series of axial protrusions or recesses 134 on the inner surface of the clamping element 130, as visible in FIG. 4. The axial protrusions 113 on the male collar 110 are most clearly visible in FIG. 6b. Channels/recesses/grooves are formed between adjacent axial protrusions 113 and 134.

The axial protrusions 113 and 134 are optional components that help to reduce rotational movement of the clamping element 130 relative to the male collar 110 and tubing 200 by increasing the strength of the interaction between the clamping element 130 and the male collar 110. When the clamping element 130 is placed against the male collar 110, the axial protrusions interlock and thereby restrict relative rotational movement between these components (as described in further detail below, the clamping element 130 is held in position radially and axially by the male collar 110 and female collar 120).

As can be seen in FIG. 6b, the axial protrusions 113 of the male collar taper in an axial direction away from the gripping fingers 114, i.e. the channel formed between adjacent axial protrusions narrows to a point. This optional tapering assists in ensuring that the axial protrusions 113 and 134 align correctly when the clamping element 130 is placed onto the male collar 110. The axial protrusions 134 on the inner surface of the clamping element may optionally also be tapered.

Figure 9:
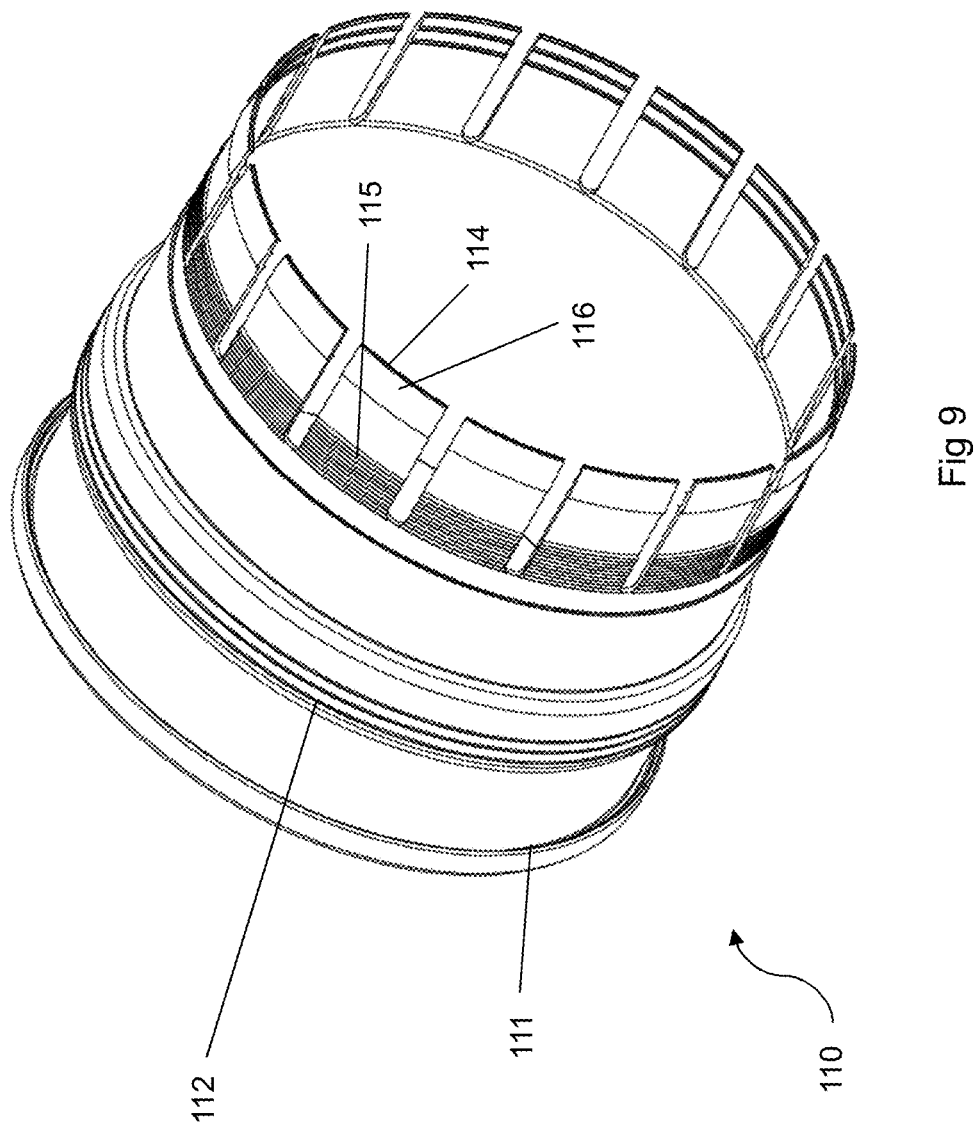
FIG. 9 shows an alternative embodiment of a male collar.
Figure 10:
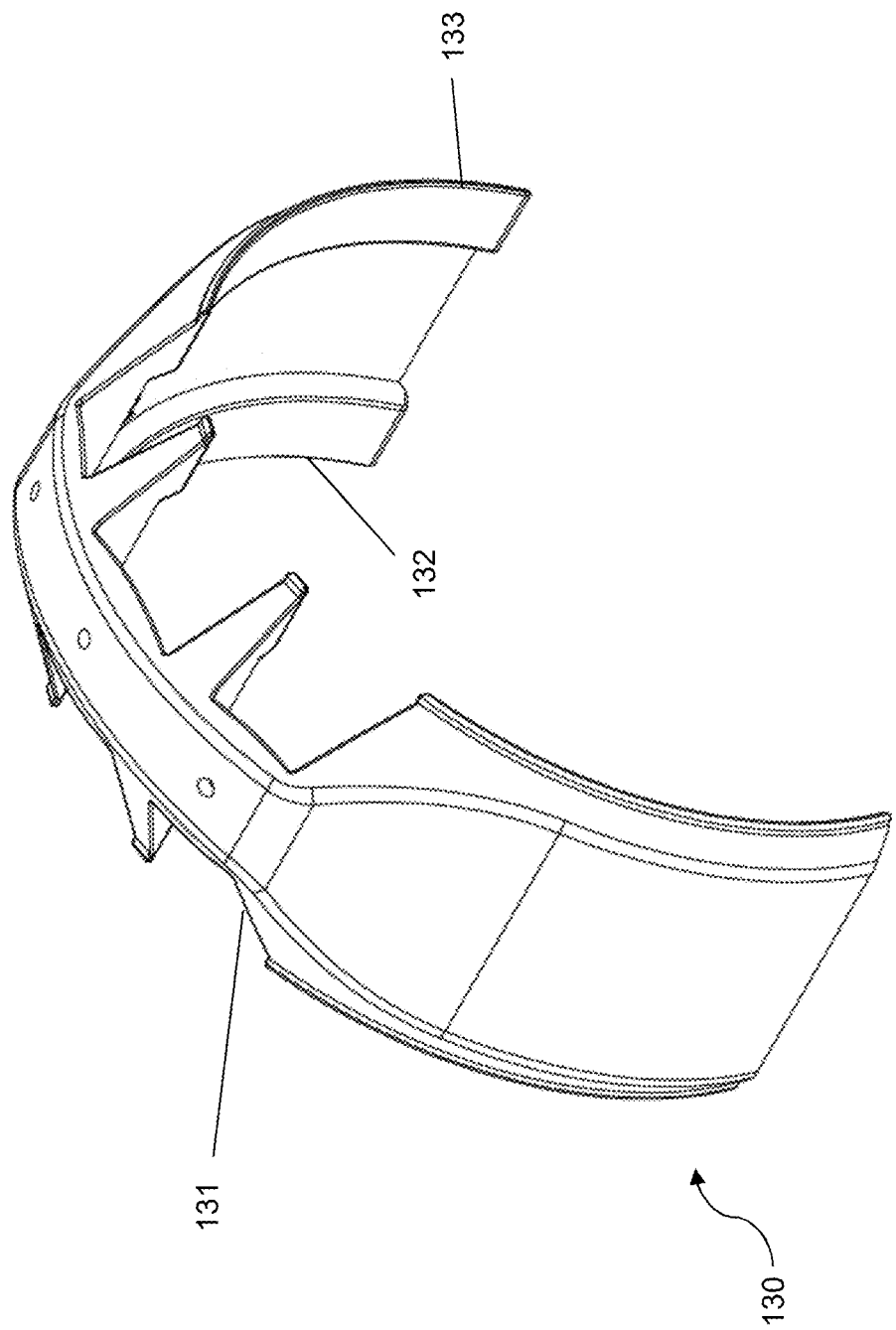
FIG. 10 shows an alternative embodiment of a clamping element.

Alternative embodiments of the male collar 110 and clamping element 130 are shown without axial protrusions in FIGS. 9 and 10. With these alternative embodiments, the clamping element 130 may either be free to move rotationally relative to the male collar 110 and tubing 200, or may be held in position relative to the male collar 110 and tubing 200 by friction alone (for example through the friction between the inner surface of the clamping element 130 and the outer surface of the male collar 110, or between any other suitable abutting surfaces).

Figure 8A:
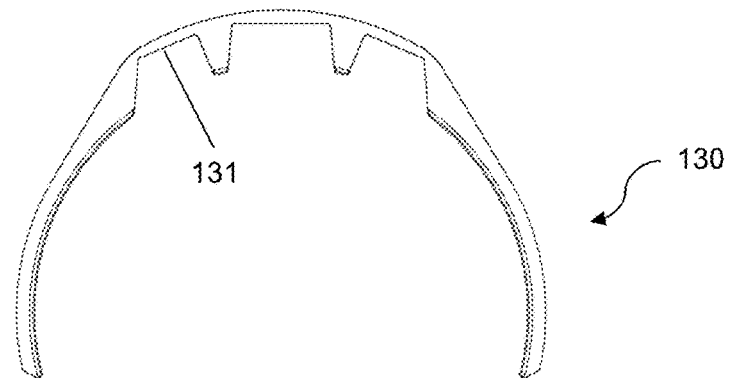
FIGS. 8a, 8B and 8c show end-on, side-on and cross-sectional views of the clamping element respectively.
Figure 8B:
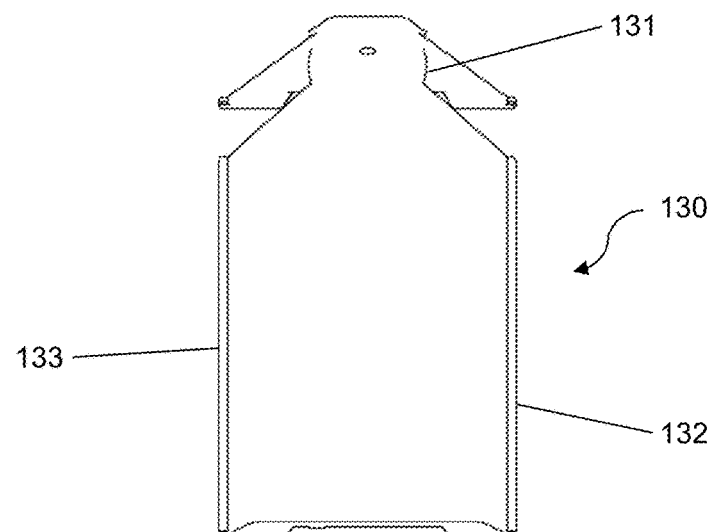
Figure 8C:
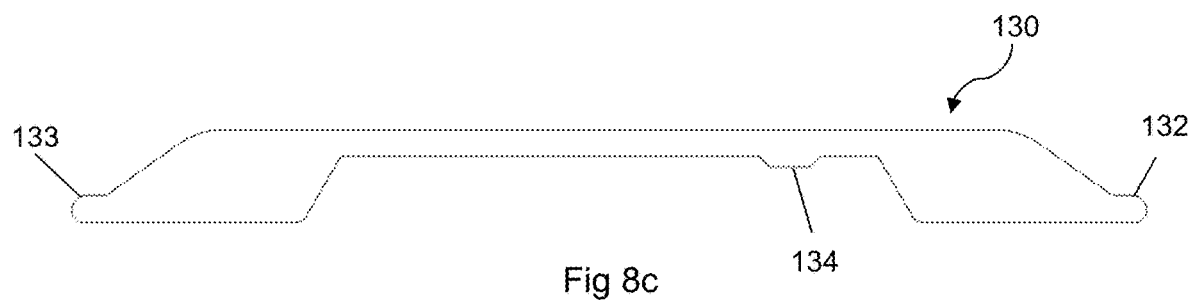

Referring now to FIG. 4, the clamping element 130 has a cross section similar to the arc of a circle. In other words, the cross section of the clamping element 130 is similar in shape to a broken circle, such that the clamping element is generally shaped as part of a tube. Additional views of the clamping element are shown in FIGS. 8a, 8b and 8c. The clamping element 130 is preferably manufactured through a casting process, and may be manufactured of any suitable material, such as steel. The clamping element 130 may alternatively be machined.

Figure 12:
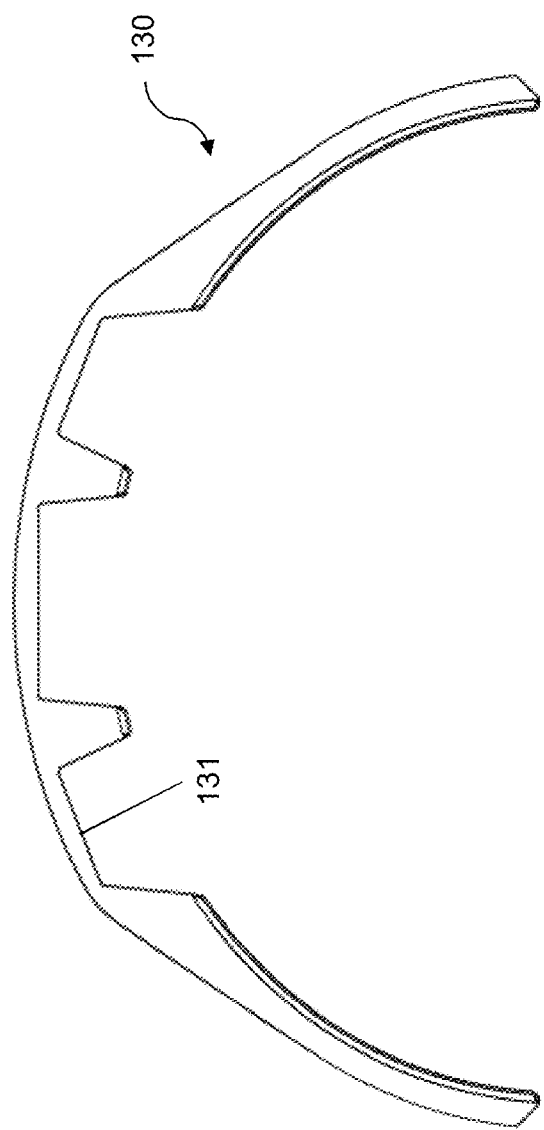
FIG. 12 shows a side view of another alternative embodiment of a clamping element.

As visible in FIG. 8a, the arc-shaped cross section of the clamping element 130 may be larger than a semicircle, but alternative embodiments are also envisaged in which the arc-shaped cross section of the clamping element 130 is smaller than a semicircle, such as that shown in FIG. 12. Having a cross section larger than a semicircle means that clamping element 130 can be placed against the outer surface of the male collar 110 prior to pressing the male collar 110 and female collar 120 together without the clamping element 130 falling away from the male collar 110. However, this also requires that the clamping element 130 is elastically deformed over the tubing 200 and/or male collar 110 during installation to enable it to fit over the tubing 200 and/or male collar 110.

The arcuate shape of the clamping element 130 means that it can be placed over the male collar 130 and tubing 200 at any circumferential angle. That is, the clamping element 130 can be positioned anywhere around the circumference of the male collar 110 during installation (as long as the clamping element 130 is aligned with male collar 110 in the axial direction) and does not have to be installed from a particular direction. The clamping element 130, male collar 120 and female collar 110 can all be installed at any relative rotational position with respect to each other. This flexibility makes it easier for automated installation of the control line clamp assembly as it removes the need for a specific rotational alignment between the components.

As best seen in FIG. 8c, the clamping element 130 has a first lip or protrusion 132 shaped to be retained in the groove or recess 111 of the male collar 110 and a second lip or protrusion 133 shaped to be retained in the recess 121 of the female collar 120. These lips or protrusions enable the clamping element 130 to be secured in position relative to the tubing 200 by the male collar 110 and female collar 130.

As shown in FIGS. 4, 8b and 8c, the lips 132 and 133 are formed as axial flanges protruding from each side of the clamping element 130. While the illustrated lips 132 and 133 are continuous apart from the channels or slots 131 (described below), alternative embodiments are envisaged with discontinuous lips 132 and 133 on one or both sides of the clamping element 130, i.e. multiple shorter lip segments.

As mentioned above, the lips 132 and 133 are shaped to be received in the groove or recess 111 and the recess 121. When the clamping element 130 is positioned between the male collar 110 and female collar 120 and the two collars are pressed together, the lips 132 and 133 are forced in to the respective groove or recess such that the lips 132 and 133 are at least partly surrounded by the grooves or recesses on the collars.

Ideally the radial dimension of each lip 132 and 133 is similar to the radial dimension of the groove or recess into which it is received in order to provide a tight fit that minimises relative radial movement between the clamping element 130 and the collars.

In addition, the axial dimension of the lips 132 and 133 and grooves or recesses should be large enough to ensure that a sufficient length of the lips 132 and 133 is retained within the grooves or recesses to prevent the clamping element 130 coming detached from the collars under high radial or axial forces (for example due to the lips 132 and 133 breaking or deforming or slipping out of the grooves or recesses).

While the illustrated embodiment has lips 132 and 133 that are formed by axially protruding flanges, alternative embodiments are envisaged in which the lips are replaced with other protrusions such as a series of pegs, dowels, catches, arms or fingers that are received in one or more corresponding grooves, recesses or openings on each collar. Having multiple axial protrusions on each side of the clamping element 130 that each engage with a corresponding one recess of a similar size (i.e. multiple recesses, one for each protrusion) restricts relative rotational movement of the clamping element and the collars.

Furthermore, the protrusions could instead be provided on one or both of the collars, and one or more openings or recesses could be provided on one or both sides of the clamping element 130 for receiving these protrusions. In other words, the roles of the collars and clamping element could be reversed when it comes to the engagement between the clamping element 130 and the collars.

The clamping element 130 also has a series of channels or slots 131 for receiving control lines 300. The illustrated clamping element 130 has three channels or slots 131, although alternative embodiments are envisaged with more or fewer channels or slots, for example one, two, four, five or six slots. The size of each of the channels or slots 131 can be different, and each channel or slot 131 can be sized according to the control line 300 to be received in that slot 131.

Figure 5:
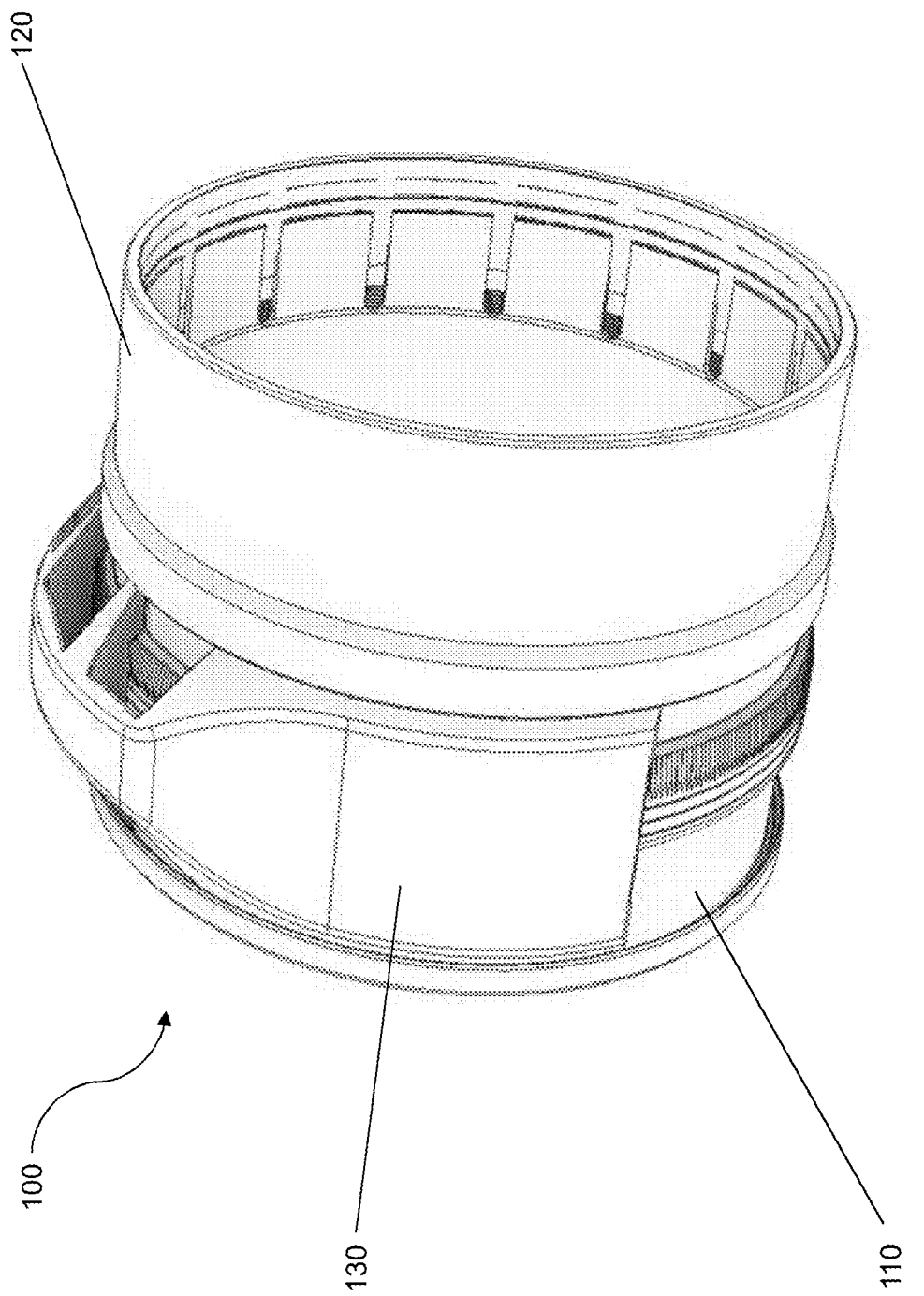
FIG. 5 shows the control line clamp assembly in an assembled configuration.

As mentioned above, in use, the clamping element 130 is held between the male collar 110 and female collar 120. In the illustrated embodiment, this is achieved by the engagement between the first lip or protrusion 132 of the clamping element 130 and the groove or recess 111 of the male collar 110, and the engagement between the second lip or protrusion 133 of the clamping element 130 and the recess 121 of the female collar 120. This engaged or assembled configuration of the control line clamp assembly is shown in FIG. 5.

In use, the clamping element 130 is positioned abutting the outer surface of the male collar 110, with one or more control lines 300 retained in each slot 131. For embodiments with tapered axial protrusions 113 and 134, the tapered axial protrusions 113 and 134 help to guide the clamping element 130 into the correct position relative to the male collar 110, i.e. with the respective axial protrusions interlocking.

Once the clamping element 130 is in position against the male collar 110, the female collar 120 is pressed over the gripping fingers 114 of the male collar 110 as described above. As the male collar 110 and female collar 120 are pressed relatively towards each other, the first lip 132 of the clamping element 130 enters the groove or recess 111 of the male collar 110 and the second lip or protrusion 133 of the clamping element 130 enters the recess 121 of the female collar 120. Once the lips 132 and 133 of the clamping element are positioned in the grooves or recesses 111 and 121 of the collars, both axial and radial movement of the clamping element 130 relative to the collars is restricted, i.e. the clamping element 130 cannot move along the tubing 200 or away from the tubing 200 relative to the collars.

As can be seen in FIGS. 6c and 7c, both the groove or recess 111 and the recess 121 have tapered sections such that each of the groove or recess 111 and recess 121 is slightly wider at its opening. These tapered sections assist in ensuring the clamping element 130 is pressed tightly against the outer surface of the male collar 110 as the male collar 110 and female collar 120 are pressed together. The groove or recess 111 and the recess 121 are preferably sized and shaped to minimise axial and radial movement of the clamping element 130 relative to the collars.

The sizing of the channels or slots 131 is preferably designed such that the clamping element 130 presses the control lines 300 against the circumferential teeth 112 of the male collar 110, thereby causing the circumferential teeth to embed in the outer surface of the control lines 300 in order to help prevent axial movement of the control lines 300 relative to the control line clamp assembly 100. The clamping element 130 must be pressed against the male collar 110 with sufficient force to achieve this. This could either be achieved by pressing the clamping element 130 firmly against the male collar 110 prior to pressing the male collar 110 and female collar 120 together, or it could be occur as a result of the tapering of the grooves or recesses 111 and 121 of the collars pressing clamping element 110 towards the outer surface of the male collar 110 as the male collar 110 and female collar 120 are pressed together.

Advantageously, attachment in this way means the control line clamp assembly 100 can be attached to a pipe by only pressing the gripping fingers 114 into the female collar 120. Unlike conventionally mounted control line clamps, which are often screwed or welded onto a tubing, the control line clamp assembly 100 of the present invention can be mounted to a tubing 200 in an automated manner. No pins, screws or welding are required to attach the control line clamp assembly 100 to the tubing 200.

As the control line clamp according to the present invention is adapted to be installed by a robotic arm or in an automated manner, fewer workers are needed in the red zone on the drill floor. Removing personnel from the red zone during operations on drill floor greatly reduces the overall risk for accidents, and in worst case, deaths. By adding automation in the form of automated installation, the need for personnel can be vastly reduced.

In addition to the advantages that result from facilitating automated installation, the attachment of the gripping fingers 114 to the tubing 200 due to the deflection/bending of the gripping fingers 114 allows a very strong gripping force to be applied to the tubing 200. The attachment mechanism delivers extremely high holding forces under all operating conditions on a range of different tubing sizes (due to the deflection of the gripping fingers 114 varying depending on how far the male collar 110 and female collar 120 are pressed together).

Additionally, conventional control line clamps take a long time to install. The press-fit connection of the present invention is quick and easy and dramatically increases the speed of installation and reduces the overall installation time. The present invention provides a control line clamp assembly 100 that is compact and easy to handle and can be partially pre-installed onshore.

Figure 13:
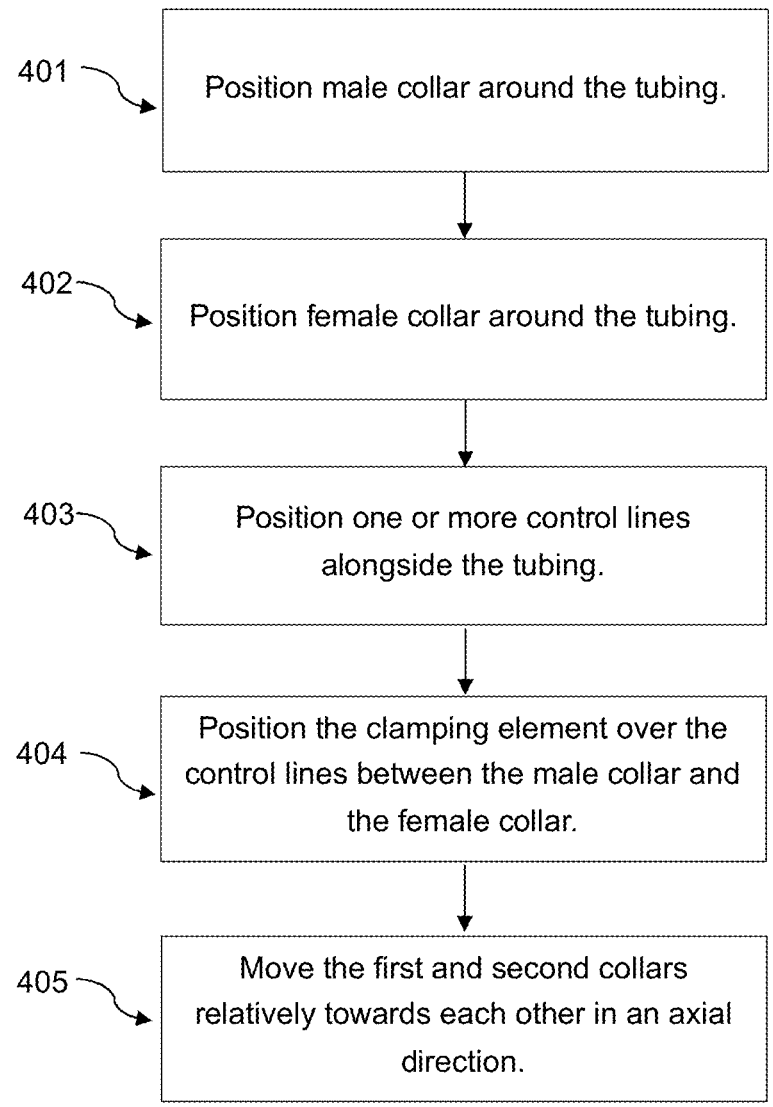
FIG. 13 is a block diagram illustrating an exemplary installation method for installing the control line clamp assembly on a tubing.

An exemplary method for attaching the control line clamp assembly 100 to the tubing 200 will now be described with reference to FIG. 13.

In steps 401 and 402, the male collar 110 and female collar 120 are positioned around the tubing, for example by sliding them over the end of the collar. The gripping fingers 114 of the male collar 110 should be facing toward the end of the female collar 120 with the recess 121.

Steps 401 and 402 may optionally be performed onshore prior to the tubing 200 being deployed, or they may alternatively be performed when the tubing 200 is being deployed. This may either be performed manually by human workers or by a robotic arm, although if these steps being performed when the tubing 200 is being deployed then it is preferred that these steps are performed in an automated manner.

At this stage, the male collar 110 and female collar 120 may optionally be pressed together slightly to lightly attach them to the tubing 200, i.e. they may be pressed together such that the gripping fingers are slightly deformed towards the outer surface of the tubing 200 just enough to grip the outer surface of the tubing 200 when no additional load is exerted on the collars. The collars should not be pressed fully together, i.e. they should only be pressed such that the clamping element 130 can still be positioned between the recess or groove 111 of the male collar 110 and the recess 121 of the female collar.

This step is particularly advantageous when the collars are installed onshore, as it will ensure the collars do not move significantly relative to the tubing 200 during transit. Again, this step may either be performed manually by human workers or by robotic or automated installation, but it is preferred that it be performed in an automated manner if this step is being performed during deployment of the tubing 200.

At step 403, one or more control lines 300 are positioned alongside the tubing 200, and the clamping element 130 is then positioned over the control lines 300 between the male collar 110 and the female collar in step 404. As these steps will generally be performed during deployment of the tubing 300, it is preferred for them to be performed by automation, but they may alternatively be performed by human workers. The positioning of the control lines 300 alongside the tubing may be performed by a robotic control line manipulator such as that described in US 2013/0186640 A1, and the clamping element 130 may be positioned by a robotic clamp handling device such as that described in US 2008/0023192 A1.

When the arc-shaped cross section of the clamping element 130 is larger than a semicircle, step 404 will involve elastically deforming the clamping element 130 in order to allow it to fit over the male collar 110 and tubing 200. This will generally be performed by a specialist tool capable of deforming the clamping element 130 as required.

As mentioned above, the clamping element 130 can be installed from any angle around the circumference of the male collar 110 due to the arcuate shape of the clamping element 130.

In embodiments in which the male collar 110 and clamping element 130 have corresponding cooperating protrusions and recesses 113 and 134 respectively, these protrusions and recesses will help to ensure the clamping element 130 is correctly positioned with respect to the male collar 110. As the clamping element 130 is positioned against the male collar 110 it presses the control lines 300 into the circumferential teeth 112, thereby causing the circumferential teeth to bite into the outer surface of each control line 300 in order to restrict axial movement of the control lines 300 relative to the male collar 110.

Finally, the male collar 110 and female collar 120 are moved relatively towards each other in step 405. Preferably, the male collar 110 is held fixed and the female collar 120 pressed over the male collar 110. However, the female collar may 120 may alternatively be held fixed and the male collar 110 pressed into the female, or both collars may be moved simultaneously towards each other.

When forcing the male and female parts of the attachment mechanism together, any number of known tools for press fitting tubular parts that are arranged around the pipe may be used. For example, the press fitting tool as shown in FIGS. 2 and 3 of U.S. Pat. No. 3,040,405, which is hereby incorporated by reference, may be used. Such a press fitting tool may be used in combination with existing robotic clamp handling device such as that described in US 2008/0023192 A1.

In this case, once the automation has positioned the clamping element 130 over the control lines 300 against the male collar 110, the arm will position the press fitting tool such that a first pressing surface of the tool abuts the end of the male collar 110 that is furthest from the female collar and a second pressing surface of the tool abuts the end of the female collar 120 that is furthest from the male collar.

The device will then actuate the tool to apply an axial compression force between the first and second pressing surfaces to thereby press the two collars relatively towards each other and force the male collar 110 and female collar 120 together. This could be performed by moving both pressing surfaces of the tool towards each other, or alternatively by keeping one pressing surface fixed and moving the other. Once the collars are pressed together, the control line clamp assembly 100 will be attached to the tubing.

The control line clamp assembly according to embodiments of the invention is suitable for industrial applications, in particular for use in the subsea oil and gas industry. The elements of the control line clamp assembly may be made of any material known for such applications, such as steel. The dimensions of the components described may be adapted as required to the control lines, pipes and other devices used in these industries.

Although the illustrated embodiments of the control line clamp assembly show the clamping element 130 abutting the outer surface of the male collar 110, the roles of the male collar 110 and female collar 120 could be swapped such that the clamping element abuts the outer surface of the female collar 120. In this embodiment, the circumferential teeth 112 may be on the outer surface of the female collar, as may the optional axial protrusions 113.

Likewise, although the illustrated embodiment is a three-part assembly, alternative embodiments are envisaged in which there are only two parts. For example, alternative embodiments of the assembly may comprise a clamping element with gripping fingers 114, where the assembly is installed by positing the clamping element over the control lines 300 and pressing the gripping fingers 114 of the clamping element into the female collar 120. Alternatively, a single collar may be attached to the tubing 200 (for example by welding or using set screws) and the clamping element may be positioned over one or more control lines 300 and attached to the outer surface of the single collar using clips or friction or similar.

In addition, although the illustrated embodiment has two lips on the clamping element 130 that are received in corresponding grooves and/or recesses on the male collar 110 and female collar 120, alternative embodiments are envisaged in which the clamping element 130 has a single lip and only one of the male collar 110 and female collar 120 have a groove or recess. In this embodiment, the end of the clamping element 130 without a lip will preferably abut against an abutment portion of either the male collar 110 or female collar 120 when the male collar 110 and female collar 120 are pressed together.

The lip and groove/recess engagement could also be replaced with other engagement interfaces, for example with other forms of interlocking protrusions and openings.

While the above disclosure refers to male and female collars that are pressed together and held in place with a ratchet mechanism, alternative embodiments are also envisaged in which two collars are positioned either side of a clamping element and attached to the tubing through other means, such as set screws, welding, threads, or similar.

For example, the male and female collars could be positioned either side of the clamping element and pressed together to engage with the clamping element (for example through the lip and recess arrangement described above), but rather than having deformable fingers that grip the pipe and a ratchet that holds the collars together, the collars could be attached to the pipe by tightening one or more set screws or by welding one or both of them to a pipe. Welding or tightening set screws could either be performed manually or by automation.

The invention claimed is:

1. A method for attaching a control line clamp to a pipe, for subsea oil and gas, the control line clamp comprising:
   a clamping element for retaining one or more control lines alongside a pipe;
   a first collar; and
   a second collar,
   wherein the clamping element is arranged to be attached to the pipe by positioning the first and second collars around the pipe on opposing sides of the clamping element and moving the first and second collars relatively towards each other in an axial direction; and
   wherein the method comprises:
      positioning the first collar around the pipe;
      positioning the second collar around the pipe;
      positioning one or more control lines alongside the pipe;
      positioning the clamping element over the control lines with at least part of the clamping element between at least part of the first collar and at least part of the second collar; and
      moving the first and second collars relatively towards each other in an axial direction to thereby attach the clamping element to the pipe; and
   wherein the control line clamp is partially installed onshore.

2. The method of claim 1, wherein the steps of positioning the first collar around the pipe and positioning the second collar around the pipe are performed onshore.

3. The method of claim 1, further comprising pressing the first and second collars loosely together prior to positioning the clamping element over the control lines between the first and second collars, wherein moving the first and second collars relatively towards each other in the axial direction comprises further pressing the first and second collars together.

4. The method of claim 1, further comprising, prior to positioning the one or more control lines alongside the pipe, lightly pressing the first collar and second collar together.

5. The method of claim 4, wherein the step of lightly pressing the first collar and second collar together is performed onshore.

6. The method of claim 1, wherein the first collar comprises an engagement region arranged to interface with a first engagement region on the clamping element, and wherein the second collar comprises an engagement region arranged to interface with a second engagement region on the clamping element.

7. The method of claim 6, wherein the engagement region on the first and/or second collar comprises one or more recesses or slots.

8. The method of claim 6, wherein the first and/or second engagement region on the clamping element comprises one or more axial lips or protrusions.

9. The method of claim 6, wherein the engagement region on the first and/or second collar comprises one or more axial lips or protrusions.

10. The method of claim 6, wherein the first and/or second engagement region on the clamping element comprises one or more recesses or slots.

11. The method of claim 1, wherein the first and/or second collars are adapted to be fixed to the pipe and/or other collar.

12. The method of claim 1, wherein the first collar is a male collar and the second collar is a female sleeve, and wherein the female sleeve is arranged to receive at least part of the male collar; or wherein the first collar is a female sleeve and the second collar is a male collar, wherein the female sleeve is arranged to receive at least part of the male collar.

13. The method of claim 12, wherein the male collar comprises a plurality of fingers, and wherein the female sleeve is arranged to receive the plurality of fingers, wherein when the male collar and female sleeve are pressed together each of the plurality of fingers is bent inwards to grip the pipe.

14. The method of claim 12, wherein, when pressed together, the male collar and female sleeve are held together by a ratchet.

15. The method of claim 1, wherein an inner surface of the clamping element is arranged to abut a circumferential outer surface of the first collar.

16. The method of claim 15, wherein the circumferential outer surface of the first collar comprises one or more protrusions arranged to engage with a corresponding one or more recesses on the inner surface of the clamping element, or wherein the circumferential outer surface of the first collar comprises one or more recesses arranged to engage with a corresponding one or more protrusions on the inner surface of the clamping element.

17. The method of claim 16, wherein the one or more protrusions are tapered in an axial direction, and wherein the corresponding one or more recesses are tapered in a corresponding axial direction.

18. The method of claim 1, wherein the circumferential outer surface of the first collar comprises one or more circumferential teeth arranged to engage with an outer surface of the control line or a control line housing.

19. The method of claim 1, wherein the inner surface of the clamping element comprises one or more slots arranged to receive the one or more control lines or one or more control line housings.

20. The method of claim 1, wherein the clamping element has an arc-shaped cross section.

* * * * *